(12) United States Patent   (10) Patent No.: US 7,507,158 B2
Murzanski et al.   (45) Date of Patent: *Mar. 24, 2009

(54) FORCE FEEDBACK MECHANISM FOR GAMEPAD DEVICE

(75) Inventors: Chris A. Murzanski, North Bend, WA (US); Kurt T. Nielsen, Mukilteo, WA (US); Gary L. Gordon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 723 days.

This patent is subject to a terminal disclaimer.

(21) Appl. No.: 10/900,838

(22) Filed: Jul. 27, 2004

(65) Prior Publication Data

US 2005/0009606 A1   Jan. 13, 2005

Related U.S. Application Data

(60) Continuation of application No. 10/441,393, filed on May 20, 2003, now Pat. No. 6,824,468, which is a division of application No. 09/774,194, filed on Jan. 29, 2001, now Pat. No. 6,641,480.

(51) Int. Cl.
*A63F 9/24* (2006.01)
(52) U.S. Cl. ............... 463/38; 273/148 B; 345/156
(58) Field of Classification Search ............ None
See application file for complete search history.

(56) References Cited

U.S. PATENT DOCUMENTS

| | | | |
|---|---|---|---|
| 5,542,672 A | 8/1996 | Meredith | 463/37 |
| 5,643,087 A | 7/1997 | Marcus et al. | 463/38 |
| 5,691,898 A | 11/1997 | Rosenberg et al. | 463/38 |
| 5,734,373 A * | 3/1998 | Rosenberg et al. | 345/161 |
| 5,739,811 A * | 4/1998 | Rosenberg et al. | 345/161 |
| 5,897,437 A | 4/1999 | Nishiumi et al. | 463/47 |
| 5,951,404 A | 9/1999 | Oishi et al. | 463/36 |
| 5,959,613 A * | 9/1999 | Rosenberg et al. | 345/161 |
| 6,171,191 B1 | 1/2001 | Ogata et al. | 463/38 |
| 6,252,583 B1 * | 6/2001 | Braun et al. | 345/156 |

(Continued)

FOREIGN PATENT DOCUMENTS

EP   0844011 A2   5/1998

(Continued)

OTHER PUBLICATIONS

Ign pc Preview article, "Gravis Exterminator Force." May 13, 2000. Available http://pc.ign.com/hardware/184.html, 2pp.

(Continued)

*Primary Examiner*—M. Sager
(74) *Attorney, Agent, or Firm*—Workman Nydegger

(57) ABSTRACT

A hand-held input device provides a directional force feedback that acts on a housing of the device. The input device includes a threaded shaft that is rotatably driven by an electric motor. The motor causes a mass to move in response to a control signal received from a host computing device, such as personal computer that is executing a game or simulation. When the mass is rapidly accelerated or abruptly stopped in response to the control signal, the change in momentum of the mass imparts a directional reactive force to the housing, and an operator holding the housing feels the haptic force.

19 Claims, 6 Drawing Sheets

U.S. PATENT DOCUMENTS

| | | | |
|---|---|---|---|
| 6,325,719 B1 | 12/2001 | Fukawa et al. | 463/37 |
| 6,354,945 B1 | 3/2002 | Furuki et al. | 463/38 |
| 6,680,729 B1 * | 1/2004 | Shahoian et al. | 345/156 |
| 6,697,043 B1 * | 2/2004 | Shahoian | 345/156 |
| 7,084,854 B1 * | 8/2006 | Moore et al. | 345/157 |
| 2005/0085299 A1 | 4/2005 | Murzanski | |

FOREIGN PATENT DOCUMENTS

| | | |
|---|---|---|
| EP | 0 903 659 | 3/1999 |
| EP | 0 977 142 | 2/2000 |
| JP | 1 057 504 | 5/2000 |
| WO | WO 96/42078 | 12/1996 |
| WO | WO 99/66997 | 12/1999 |

OTHER PUBLICATIONS

The Bevel Gear [http://www.1pub.com/machines/6a.thm], p. 1-2.

Office Action dated Sep. 19, 2007 cited in related U.S. Appl. No. 10/912,674.

Office Action dated Feb. 11, 2008 cited in related U.S. Appl. No. 10/912,674.

Office Action dated Jun. 25, 2008 cited in related U.S. Appl. No. 10/912,674.

* cited by examiner

FORCE FEEDBACK MECHANISM FOR GAMEPAD DEVICE

RELATED APPLICATIONS

This application is a continuation of prior co-pending patent application Ser. No. 10/441,393, filed on May 20, 2003, which itself is a continuation of prior application Ser. No. 09/774,194, filed on Jan. 29, 2001 and now issued as U.S. Pat. No. 6,641,480 on Nov. 4, 2003, the benefit of the filing dates of which is hereby claimed under 35 U.S.C. § 120.

FIELD OF THE INVENTION

The present invention generally relates to a mechanism that generates a force in a hand-held user input device used in connection with a host computing device, and more specifically, to a mechanism that imparts a directional haptic feedback on the housing of a hand-held user input device in response to a signal from a host computing device.

BACKGROUND OF THE INVENTION

A number of haptic user input devices have been developed to provide force feedback in response to a signal from a host computer, e.g., during simulations or game play executed on the host computer. For example, Microsoft Corporation's SIDEWINDER™ joystick provides haptic feedback to a user gripping the joystick in response to events occurring in computer games, based upon commands transmitted from a host computer to the joystick. For instance, if a simulated character displayed during execution of a computer game is struck by a simulated projectile, such as a boulder, a signal from the host computer causes an actuator in the joystick housing to abruptly move the joystick in the same direction as the path of the simulated projectile. The force produced by the actuator on the control handle imparts a haptic sensation to the user's hand, which is gripping the joystick control handle, indicating that the character has been hit by the projectile. In another instance, if a user commands a simulated character to move into a simulated wall, by moving the joystick control handle in an appropriate direction, a signal from the host computer causes the actuator to produce a force that resists the user's movement of the joystick control hand in that direction. This force imparts a haptic sensation to the user's hand that is gripping the joystick to indicate that the simulated character controlled by the joystick has run into the wall.

Similarly, Microsoft Corporation's SIDEWINDER™ wheel provides haptic feedback to a user gripping the wheel and using it to control a simulated vehicle, in response to a signal from the host computer on which the vehicle simulation is executed. If a simulated vehicle strikes and rebounds from a simulated wall, a signal from the simulation causes an actuator coupled to a shaft on which the wheel is mounted to abruptly turn the wheel in the same direction as the simulated vehicle is rebounding. The wheel also vibrates in response to a simulated rough surface over which the vehicle is traveling.

In contrast to haptic joysticks and haptic wheels, force feedback is typically applied to gamepad input devices in a different manner. A gamepad input device uses a multi-position rocker switch that is normally actuated by a user's thumb to provide input signals that control objects on a screen of a host computer or computing device. Since a gamepad input device does not include a control handle or wheel that is gripped by a user, haptic feedback cannot be applied directly to a control component that is held by the user. Instead, in prior art haptic gamepad input devices, a vibration that is applied to the housing of the gamepad has been produced in response to a signal from the host computing device. Vibration of the housing of a gamepad user input device is often produced by rotating offset counter weights or by energizing and de-energizing an electromagnetic device to vibrate a ferromagnetic mass. Such vibration does not provide a directional force feedback along a specific axis. Directionless vibration is thus currently used for several gamepad hand-held devices that do not include a joystick control handle, a wheel, or other control member that can be gripped and moved relative to the housing of the device. The relatively simple mechanisms that provide vibration do not add substantial weight to a gamepad, making it more comfortable for the user to support.

However, it would be desirable to enhance a user's experience with a hand-held input device such as a gamepad by providing directional haptic feedback to the user. One approach was disclosed in commonly assigned U.S. Pat. No. 5,643,087, which describes a hand-held input device with a moveable member that cradles a thumb or other digit of the user's hand. The moveable member is thus comparable to a non-graspable mini joystick control handle, but provides more effective contact with the user by at least partially looping around the user's digit. The moveable member can be moved relative to two orthogonal axes and receives a haptic force directed along one or both of these orthogonal axes.

While the above approach is effective, the directional haptic feedback is primarily limited to a single digit of a user. It would therefore be desirable to provide directional haptic feedback to at least one of the user's hands, as is currently provided by grasping the control handle or wheel of haptic devices, but without requiring a large graspable control member on the input device.

SUMMARY OF THE INVENTION

In accord with the present invention, an input device is defined that provides a directed force feedback sensation to a user holding the device. The input device comprises a housing that is adapted to be handheld, i.e., sufficiently small to be supported in an operator's hand. A prime mover is disposed within the housing and is operatively coupled to a mass. The prime mover causes the mass to move in response to a control signal received from a host device. A directional force is imparted to the housing when the mass starts and stops moving due to a change in momentum of the mass, providing a haptic sensation that is directed through the housing to the user holding the housing.

Preferably, the primer mover comprises an electric motor that rotates a motor shaft to move the mass. The input device can also include a sensor for determining a position, velocity and/or acceleration of the mass, directly, or indirectly, such as by monitoring a rotation angle of the shaft.

The input device preferably employs a transmission to couple the prime mover to the mass, causing the mass to move. Also preferably, the transmission is a gear drive in which a first gear on an end of the shaft is coupled to a second gear. The second gear is pivotally mounted to the housing. Connected to the second gear is an arm that extends outwardly, normal to an axis of rotation of the second gear. The mass is attached at a distal end of the arm, so that as the first gear drives the second gear in rotation about a pivot point, the mass moves through an arc.

The mass is thus driven through at least a portion of the arc, and when stopped abruptly, imparts a reactive force to the housing in a linear direction generally tangent to the arc of the mass. The direction of this reactive force can be selectively modified by changing the disposition of the arc and a stopping point of the mass along the arc. Alternatively, or in addition, the mass is stopped when the mass or arm contacts a mechanical stop.

In another embodiment, the mass is moved through an arc by a mechanically linked arm. A transmission for this embodiment includes a threaded shaft that is rotated by the actuator. The actuator either drives the shaft directly, or alternatively, through a pair of bevel gears. The threads of the shaft mesh with internal threads of a lead nut that moves along at least a portion of the length of the shaft as the shaft rotates. The nut has a pin extending normal to the axis of the shaft and into a slot disposed in a proximal end of the linkage arm. As the nut moves along the length of the shaft, the pin acts against an edge of the slot in the arm, causing the arm to pivot about a pivot point. A distal end of the arm, to which the mass is attached, pivots about the pivot point in the same rotational direction as the proximal end of the arm. When the nut stops, the pin contacts the opposite edge of the slot in the arm, causing the arm and mass to stop at a point along the arc. Alternatively, or in addition, the mass may stop when the mass, linkage arm, or nut contacts a mechanical stop.

Yet another embodiment simply uses a nut as the mass. The nut is prevented from rotating with the shaft and instead, moves along the shaft as the threaded shaft rotates. The mass stops at end points or when the shaft stops.

The present invention preferably further comprises a controller that energizes the prime mover, causing the prime mover to move the mass in response to the control signal received from a host device, such as a computer, set top box, video game controller, electronic game, or toy to which the input device is coupled. In addition, the force signal may be in response to a schedule of commands stored in a memory included in the input device.

Another aspect of the invention is a method for developing a directional haptic force on a housing of an input device. The method includes steps that are generally consistent with the functions implemented by the components of the apparatus described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
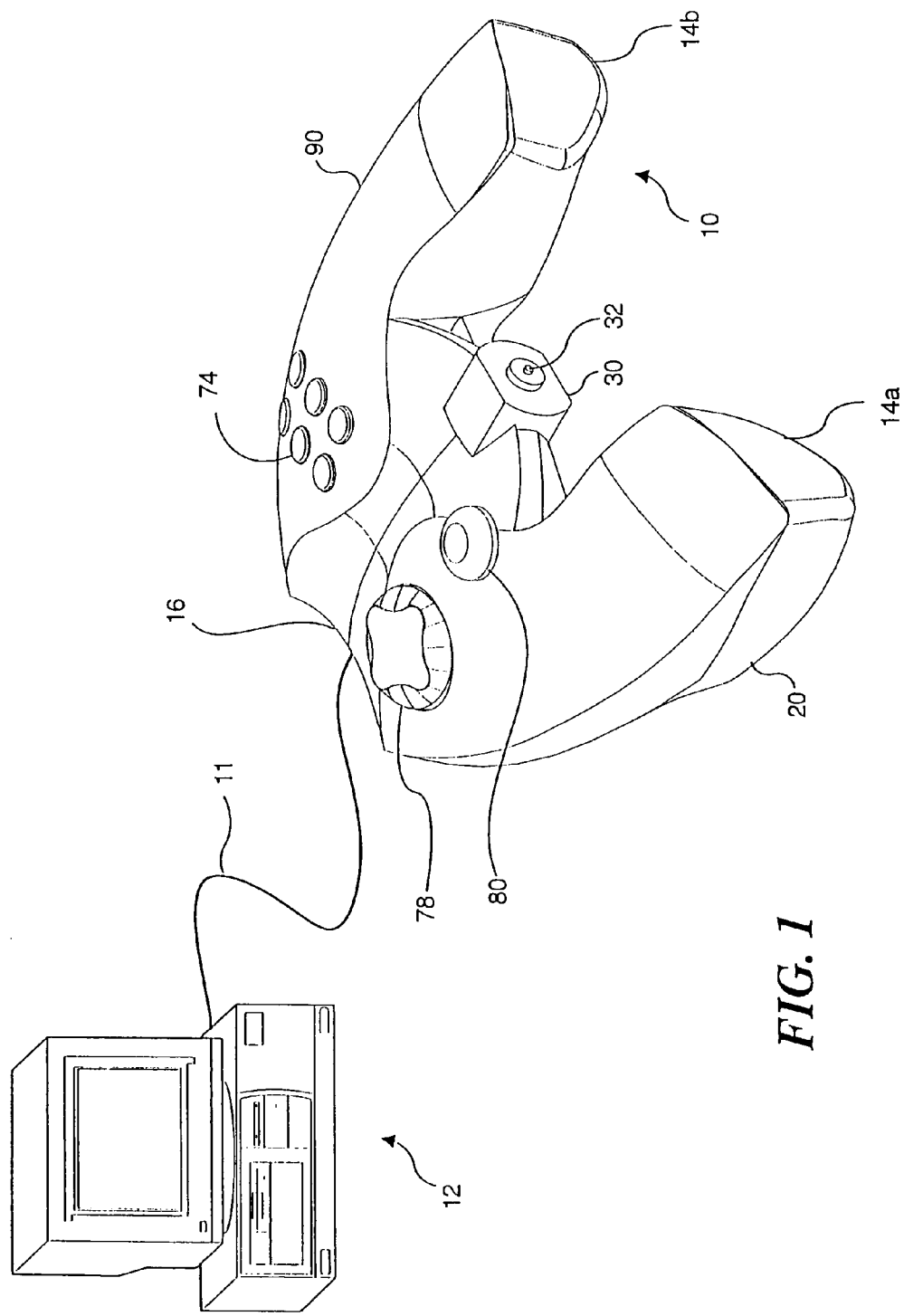
FIG. 1 is an isometric view illustrating externally visible components of the input device.

As shown in FIG. 1, the present invention has initially been implemented in a hand-held user input device configured as a gamepad 10 that provides haptic feedback in response to signals over a connection 11 from a computer game executing on a personal computer, a video game console, or other host computing device 12. For example, it is contemplated that gamepad 10 may be used with Microsoft Corporation's X-BOX™ video game console. Preferably, gamepad 10 enables a user to provide input signals to the computer game, and adapted to enable a user to perceive a directional tactile sensation as a result of the haptic feedback. Gamepad 10 is generally sized and shaped to be held by one or both hands of a user. Preferably, the gamepad is shaped generally in the form of an inverted "U," as viewed by a user holding it in its normal operating position. The user typically grasps either or both generally straight left lobe 14a and/or right lobe 14b, using one or both hands, with a closed end 16 of the U-shaped gamepad directed away from the user. Preferably, gamepad 10 includes a bottom housing 20 and a top housing 90 that are fastened together using threaded fasteners (not shown). The housings support other components, including those mounted in the interior of the gamepad, which are discussed below, in connection with the embodiments shown in the exploded views of FIGS. 2 and 4. At the inside center of the "U" shape housing is disposed a motor 30 with a motor shaft 32, as evident in the shape of bottom housing 20 and top housing 90 at that point. User-manipulated components are mounted so that they extend through top housing 90 to facilitate user control of graphic objects on host computing device 12 with gamepad 10. Included among the user manipulated components are control buttons 74, a multi-directional D-pad 78, and a thumb stick 80. Although details are not shown in the drawings, multi-directional D-pad 78 is a rocker switch that includes four switch contacts and produces a digital signal indicating the switch contact or combination of adjacent switch contacts are actuating as the user rocks the D-pad in one of eight angularly spaced-apart directions. Thumb stick 80 is similar to a thumb-actuated joystick control handle used to move a graphic object on the host computing device relative to orthogonal X and Y axes. Further details of the controls provided on the gamepad are unnecessary and need not be shown, since such details are not particularly relevant to the present invention.

Figure 2:
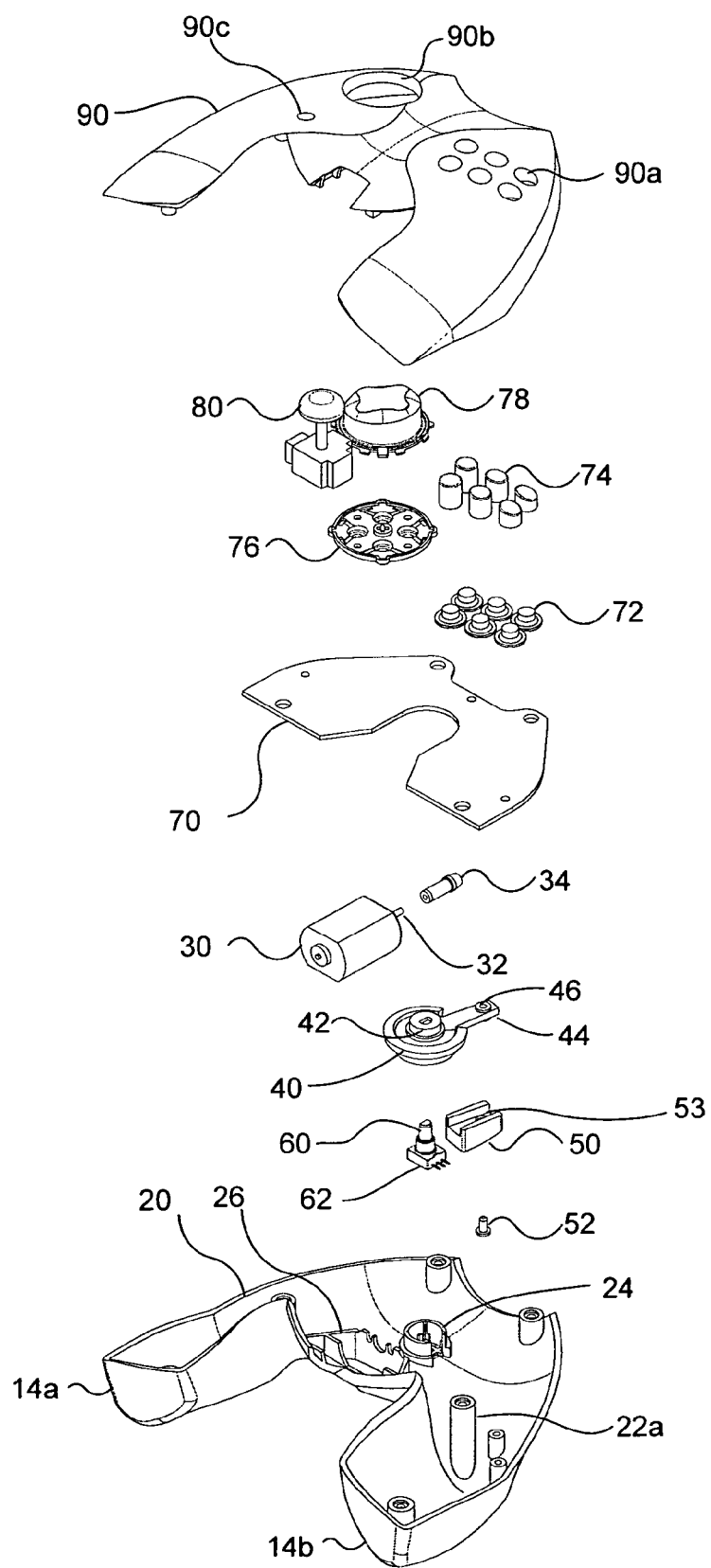
FIG. 2 is an exploded view of a first preferred embodiment of the input device.

FIG. 2 illustrates an exploded view of gamepad 10. Top housing 90 and bottom housing 20 are preferably made of molded plastic and contoured to facilitate left lobe 14a and right lobe 14b of the gamepad being grasped by the hands of a user. Disposed on the inside of bottom housing 20 is a plurality of internally threaded posts 22a, for coupling with fasteners (not shown) that attach other components of the gamepad to the bottom housing. Near a central location of the bottom housing are a pivot mount 24 and a motor mount 26. Preferably the pivot mount and motor mount are molded into the plastic of bottom housing 20 and contoured to provide an interface seat and supporting surface.

Seated in the contour of motor mount 26 is motor 30. In this first preferred embodiment, motor 30 is preferably a Model NF223G electric motor, sold by Johnson Electric Engineering, Ltd. Other similar types and models of electric motors can alternatively be used. Motor 30 is rated to draw approximately 400 ma of current when producing a torque on motor shaft 32 of approximately $3.25 \times 10^{-3}$ Newton-meters. Affixed to the inwardly extending end of motor shaft 32 is a drive gear 34, which is preferably a bevel gear.

Drive gear 34 engages a bevel gear 40, which has a rotational axis that is perpendicular to the rotational axis of drive gear 34. Gear 40 includes a hub 42 and an arm 44 that extends radially outward from the hub. Teeth (not shown) extend radially around the circumference of gear 40, from one side of arm 44 to an opposite side. Arm 44 extends outwardly from the center of gear 40, in a direction that is perpendicular to the rotational axis of the pendulum bevel gear. At a distal end of arm 44, an insert 46 is fixed through a hole in arm 44.

A mass 50 is fastened to the distal end of arm 44 with a fastener 52 that is inserted through an orifice 53 in mass 50 and into threaded insert 46. Mass 50 preferably includes a channel that seats over arm 44 and is contoured to avoid interference with bottom housing 20 as arm 44 and mass 50 sweep through a limited arc. Mass 50 is preferably fabricated from a dense material or a metal, such as lead, that enables its volumetric size to be minimized. In this embodiment, mass 50 is approximately 20 grams.

Assembled arm 44 and mass 50 are attached to a D shaft 60 of a rotational position sensor 62 by seating the corresponding D-shaped opening in the center of hub 42 onto the D shaft. Rotational position sensor 62 is preferably a potentiometer that has a variable electrical resistance proportional to a rotational position of the D shaft. The rotational position sensor is fixed within pivot mount 24. Assembled arm 44 and mass 50 are rotatably attached to pivot mount 24 so that the arm and mass may rotate through an arc. The rotational movement of the arm is monitored, since D shaft 60 of rotational position sensor 62 is rotated as the arm moves through the arc relative to the bottom housing.

Also attached to bottom housing 20 is a printed circuit board 70, including circuitry for providing power management and control of motor 30. Printed circuit board 70 includes circuitry for communicating with a host device such as computer 12, which executes software that responds to input signals received from gamepad 10, and produces haptic feedback control signals supplied to the gamepad. While such communication may be wireless, it is currently implemented over a cable that is connected to a universal serial bus (USB) port. Specifically, Fullspeed USB is preferred but Lowspeed USB is possible. In response to control signals from a software program such as a computer game, a controller (not shown) on circuit board 70 energizes motor 30. The controller may also energize motor 30 based upon user input signals from any of switches 72 that are actuated when a corresponding button 74 is depressed by the user. Similarly, input signals are obtained through manipulation of a D-pad switch assembly 76, which activates switches (details of which are not shown) when D-pad 78 is depressed in one of eight directions. Input signals that cause motor 30 to be energized by the controller may also be generated in response to a user manipulating thumb stick 80.

Switches 72, buttons 74, D-pad switch assembly 76, D-pad 78, and thumb stick 80 are coupled to printed circuit board 70, which is fastened to bottom housing 20 and covered by top housing 90. Top housing 90 is attached to bottom housing 20, so that buttons 74, D-pad 78, and thumb stick 80 protrude through corresponding orifices 90a, 90b, and 90c, respectively, in top housing 90.

Figure 3:
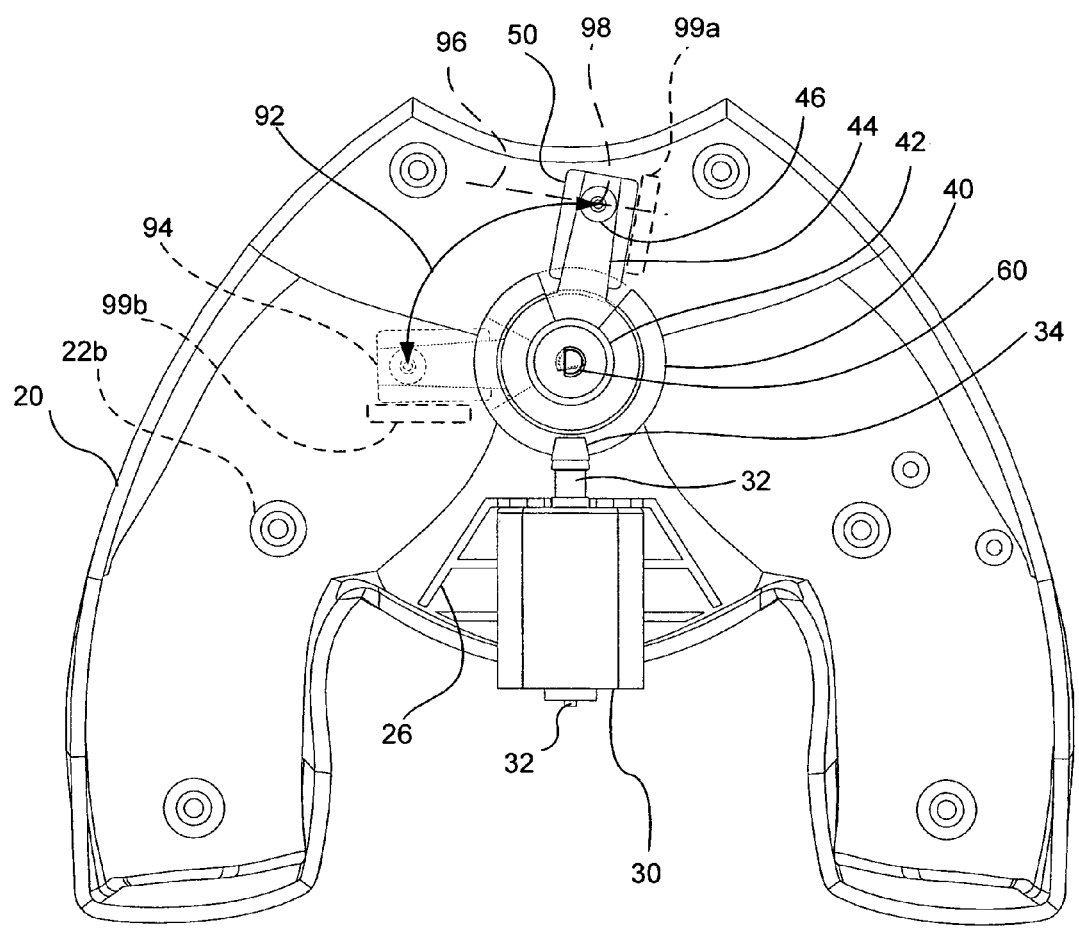
FIG. 3 is plan view of internal components of the first preferred embodiment of the input device.

FIG. 3 illustrates the disposition of the primary haptic feedback components in bottom housing 20. Bottom housing 20 includes a plurality of posts, such as post 22b, for guiding fasteners to secure printed circuit board 70 and top housing 90 (both of FIG. 1). Bottom housing 20 also includes motor mount section 26, which is molded to conform to the contour of motor 30 to hold the motor in place when top housing 90 is seated over the motor and attached to bottom housing 20.

Motor gear 34 is fixed to motor shaft 32 so that the motor gear rotates at the same rate as motor shaft 32. Motor gear 34 is preferably a bevel gear, including teeth that engage the teeth of gear 40. Preferably, the gear ratio employed is such that six rotations of motor gear 34 occur for one rotation of gear 40 (i.e., a six-to-one ratio). Hub 42 of gear 40 is attached to D shaft 60 of position sensor 62. When motor 30 is provided with a force signal, motor gear 34 rotates, causing gear 40 to rotate about the axis of D shaft 60, which also causes arm 44 to pivot about the central axis of the D shaft.

Arm 44 carries mass 50, which is fastened to arm 44 with a fastener 52 (shown in FIG. 2) that engages threaded insert 46. Mass 50 circumscribes an arc 92 about a point that is on the axis of D shaft 60. Arc 92 represents the travel of arm 44 from a first position, such as a phantom position 94 indicated with dash lines in the Figure, to a second position, which is shown in solid lines in the Figure. When the force signal is removed, current flow to motor 30 is interrupted so that the motor stops driving motor gear 34, which stops the movement of gear 40 and mass 50. As mass 50 suddenly stops moving, a reactive force corresponding to the change in momentum of the mass is imparted through arm 44 and hub 42 of gear 40 to the D shaft and housing of position sensor 62, and thus, to bottom housing 20. The magnitude of the reactive force is a function of the current provided to energize motor 30. For example, a 400 ma current provided to energize motor 30 should produce a force of approximately 0.12 pounds (0.54 Nm) applied in moving mass 50. The reactive force is directed along a line 96, which is tangent to a point 98 on circumscribed arc 92 where mass 50 suddenly stops. Mass 50 stops moving in a very short time interval, for example, within about 10 milliseconds. As is well known, the time is dependent on the mass, gear ratio, velocity, etc. All parameters affect system. Note also, that if the mass stops against a mechanical stop, the time is very short and produces the most force.

As indicated above, the point where mass 50 decelerates and stops, and thus, the direction of the line tangent to the arc can be controlled to impart a force on bottom housing 20 in a desired direction. In many cases, it may be desirable to impart a force along either an X axis, directed from left to right (depending upon the direction in which mass 50 was moving when stopped) or along a Y axis, directed from top to bottom (i.e., away or toward the user—again depending upon the direction in which mass 50 was moving when suddenly stopped). A reactive force is also generated when the mass is initially rapidly accelerated from a rest position, again depending upon where the mass was located when the acceleration was initially applied by energizing motor 30. Alternatively or in addition, the reactive force can be generated by causing mass 50 to impact optional mechanical stops 99a and 99b.

Figure 4:
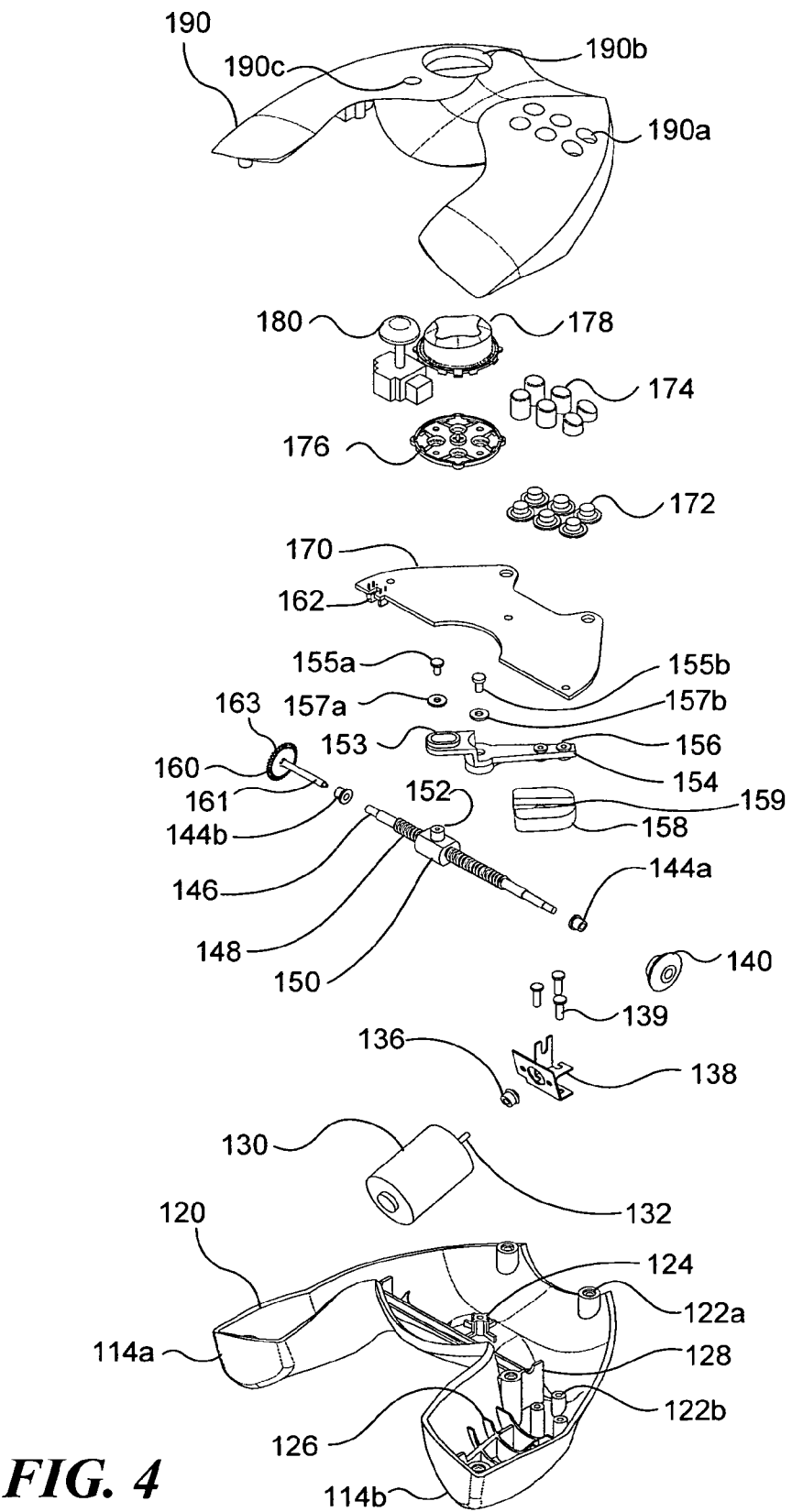
FIG. 4 is an exploded view of a second preferred embodiment of the input device.

FIG. 4 illustrates an exploded view of another embodiment of a game pad. Like the first embodiment described above, the second embodiment includes a bottom housing 120 that is preferably made of a molded plastic with outer dimensions and contour that readily enables a user to hold left lobe 114a and/or right lobe 114b with one or both hands. Bottom housing 120 includes fastener guides 122a and 122b (typical) for mounting components and connecting to the top housing. Disposed within bottom housing 120 are a linkage mount 124, a motor mount 126, and a shaft mount 128. Preferably, the mounts are molded into bottom housing 120 and are shaped to match the contour of the components they support. For example, motor mount 126 conforms to the contour of motor 130, which is seated within right lobe 114b.

Preferably, motor 130 is a Model HC313G electric motor, available from Johnson Electric Industrial Manufactory, Ltd., although it will be understood that any similar motor available from other sources can alternatively be used. This motor will preferably produce a torque on a motor shaft 132 of approximately $5.70 \times 10^{-3}$ Newton-meters when energized with a current of approximately 400 ma. Fixed to motor shaft 132 is a bevel gear 136. Motor shaft 132 and bevel gear 136 are inserted through a hole in a motor plate 138, which is fastened to bottom housing 120 with fasteners 139.

Bevel gear 136 engages a shaft bevel gear 140, which is rotationally attached to a bearing 144a. Bearing 144a is seated on shaft mount 128 and supports threaded shaft 146, permitting the shaft to freely rotate. Shaft bevel gear 140 is mounted on threaded shaft 146, such that the threaded shaft rotates when motor bevel gear 136 drives shaft bevel gear 140. Threaded shaft 146 is also rotatably supported by a bearing 144b, which is disposed at an opposite end of the threaded shaft 146 from the end rotatably supported by bearing 144a.

Helical threads 148 extend along a substantial length of threaded shaft 146. Engaged with threads 148 is an internally threaded lead nut 150. As threaded shaft 146 rotates, helical threads 148 drive lead nut 150 along threaded shaft 146. Lead nut 150 includes a pin 152 that extends outwardly, orthogonal to the axis of threaded shaft 146 and which is disposed in sliding contact with the edges of a slot 153. Slot 153 is formed in a proximal end of a linkage arm 154. Pin 152 is slidingly retained within slot 153 by a fastener 155a and a washer 157a. Linkage arm 154 is pivotally connected to linkage mount 124 and pivotally retained there with a fastener 155b and a washer 157b.

At a distal end of linkage arm 154, i.e., at the end opposite that where slot 153 is disposed, at least one insert 156 is used to attach a mass 158 to linkage arm 154. Mass 158 preferably includes a channel 159 in which linkage arm 154 is seated. Also, mass 158 is preferably configured in a shape that avoids interference with bottom housing 120. As was true of the mass used in the first embodiment, mass 158 is preferably of about 80 grams and made from a metal or other dense material, to enable its size to be minimized. An encoder wheel 160 is included to determine a position of mass 158 as a function of rotation by threaded shaft 146. A shaft 161 of the encoder wheel is inserted through bearing 144b and fixed to threaded shaft 146. A plurality of tabs 163 extend radially outward from a center of encoder wheel 160, around its circumference, defining slots between the tabs. As threaded shaft 146 rotates, tabs 163 pass through a light beam emitted by a light-emitting diode (LED), interrupting the light received by a sensor 162. Preferably, sensor 162 is a phototransistor or other light sensing component. As is well known in the art, when a tab rotates to block light emitted by the LED, the signal produced by the phototransistor changes state. State changes are counted to determine the number of rotations of threaded shaft 146, thereby indirectly measuring the movement and position of lead nut 152 to determine the position of linkage arm 154 and mass 158.

The circuit on a printed circuit board 170 processes state-change signals output from sensor 162, and responds to input signals received from user input controls on the gamepad and haptic feedback signals received from the host computing device to produce force signals that control the supply of electrical current to motor 130. As in the first embodiment, printed circuit board 170 includes components that communicate input signals to the host device or computer and receive haptic feedback control signals that cause the motor to be energized. Printed circuit board 170 includes components (not separately shown) that process input signals generated when button switches 172 are actuated in response to a user depressing or releasing buttons 174. Similarly, input signals are provided when a D pad switch assembly 176 contacts are actuated as a result of a user depressing an outer edge of a D pad 178. Further, input signals are provided when a user moves thumb stick 180. Also, the circuit components on printed circuit board 170 provide power management functions.

Figure 5:
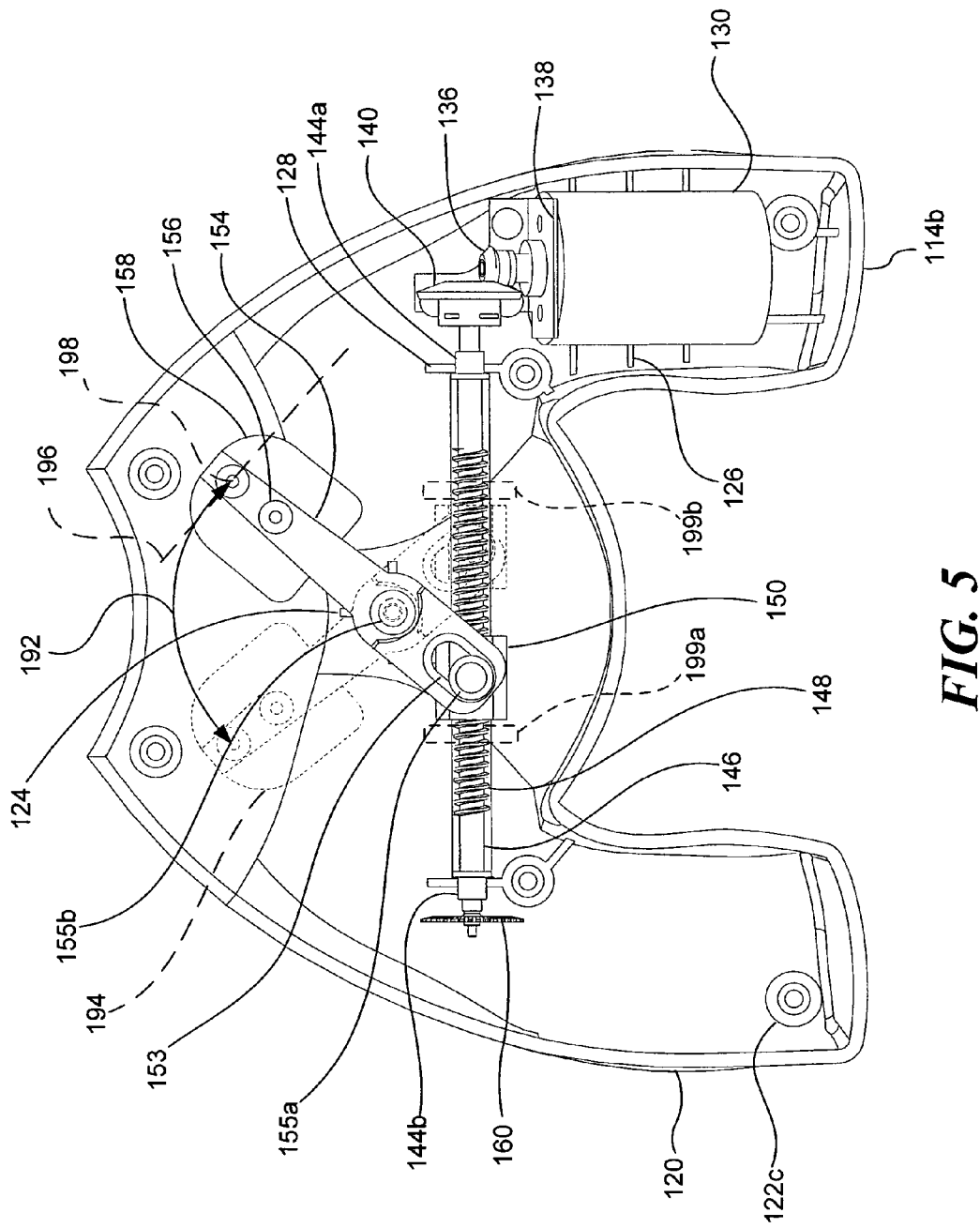
FIG. 5 is a plan view of the internal components of the second preferred embodiment of the input device.

Button switches 172, buttons 174, D pad switch assembly 176, D pad 178, and thumb stick 180 are connected to printed circuit board 170, which is fastened to bottom housing 120 and covered by a top housing 190. Top housing 190 is attached to bottom housing 120 with appropriate fasteners (not shown), enclosing the components of the gamepad. Buttons 174, D pad 178, and thumb stick 180 extend through orifices 190a, 190b, and 190c, respectively, in top housing 190. FIG. 5 illustrates a plan view of bottom housing 120 and the primary haptic feedback components. Bottom housing 120 includes a plurality of fastener guides such as fastener guide 122c. Motor mount 126 supports motor 130 in right lobe 114b of bottom housing 120. Similarly, shaft mount 128 supports bearings 144a and 144b at opposite ends of threaded shaft 146. Motor 130 is secured in position by motor plate 138. The motor shaft (not shown) extends through a hole in motor plate 138 and is fixed to bevel gear 136.

Bevel gear 136 engages shaft bevel gear 140, enabling motor 130 to drive threaded shaft 146. Preferably, the gear ratio is also approximately 6-to-1, depending on the motor torque, current, mass, etc. actually used. As indicated above, threads 148 extend along a substantial portion of the length of threaded shaft 146 and engage internal threads (not shown) of lead nut 150. This lead screw assembly enables lead nut 150 to move along the length of threaded shaft 146 as the threaded shaft rotates.

Orthogonal to the axis of threaded shaft 146, pin 152 (shown in FIG. 4) extends upwardly from the center of lead nut 150 and through slot 153 of linkage arm 154. Pin 152 is in sliding contact with an edge of slot 153 and retained within slot 153 with fastener 155a. As lead nut 150 moves along the length of threaded shaft 146, pin 152 slides along an edge of slot 153, causing linkage arm 154 to rotate about a central axis of fastener 155b and linkage mount 124.

At a distal end of linkage arm 154, mass 158 is attached to the linkage arm by fasteners (not shown) that are connected to inserts 156. As pin 152 causes linkage arm 154 to rotate, mass 158 circumscribes an arc 192 until lead nut 150 ceases to move. Preferably, the angular limit of arc 192 is up to about 100°, and represents movement of linkage arm 154 from a first position, such as that illustrated as a phantom view 194 by dash lines, to a second position shown by solid lines in the Figure. As in the previous embodiment, when mass 158 is rapidly accelerated from a rest state or quickly stopped, a reactive force is imparted through linkage arm 154, fastener 155b, and linkage mount 124 into bottom housing 120. The reactive force is also imparted through linkage arm 154, fastener 155a, pin 152 (not shown in this Figure), lead nut 150, threaded shaft 146, bearings 144a and 144b, and shaft mount 128 into bottom housing 120. As in the previous embodiment, the magnitude of the reactive force produced by accelerated the mass is proportional to the electrical current provided to energize motor 130. For example, when energized with 400 ma of current, motor 130 applies a force of approximately 0.13 pounds on the mass. The force is directed along a line 196 tangent to arc 192 at a point 198, where mass 158 was disposed when the acceleration was applied.

As indicated above, the reaction force could also be imparted on bottom housing 120 by driving mass 158 into a mechanical stop (not shown) that is attached to bottom housing 120. Alternatively, the arm itself can provide the only mass, and the motor can drive the arm into a mechanical stop, simply stop moving it, or rapidly accelerate it in a pulse motion from a rest position. In yet another embodiment, lead nut 150 can be driven into optional mechanical stops 199*a* and 199*b* that can be positioned at desired points along threaded shaft 146, causing mass 158 to impart a reactive force onto bottom housing 120 via shaft mount 128 and linkage mount 124, and causing lead nut 150 to impart some force on threads 148, threaded shaft 146, bearings 144*a* and 144*b*, and shaft mount 128 into bottom housing 120.

It is also noted that to prevent a reactive force being imparted to the housing of the gamepad for any embodiment of the present invention, the current applied to energize the motor can be increased slowly over time, in a ramp wave that extends over at least a few tenths of a second so that the mass is not suddenly accelerated from a rest position. The slower acceleration applied to the mass will make the change in motion of the mass much less evident to a user holding the gamepad. In general, moving the mass slower across the distance traveled, or moving the mass a shorter distance, will reduce the force effect.

A further embodiment eliminates linkage arm 154 and mass 158. Instead, lead nut 150 is used as the mass that imparts a reactive force to the housing. The nut moves along the threaded shaft as the threaded shaft rotates and stops at end points or when the threaded shaft stops turning. The nut is prevented from rotating with the threaded shaft by inserting pin 152 into a channel or slot (not shown) that extends along bottom housing 120 or top housing 190 generally parallel to threaded shaft 146. However, in such an embodiment, the direction of the reactive force can only be along the axis of threaded shaft 146.

The signal produced by sensor 162 monitoring rotation of encoder wheel 160 enables the control circuit in the gamepad to determine position, velocity, and acceleration of lead nut 150, linkage arm 154, and/or mass 158, so that the magnitude and direction of the reactive force can be controlled along at least one axis. It is also contemplated that the control circuit will include a memory (not shown) in which a schedule of force effects is stored that cause a predetermined sequence of reactive forces to be generated by the present invention, in response to a corresponding control signal received from the host computing device. The sequence of reactive forces can be defined in terms of one or more parameters, including magnitude and direction. For example, a series of directed reactive forces of various magnitudes and directions, simulating the feel of a vibrating control in a spacecraft that is part of a game or simulation can be produced by the present invention in response to receiving a control signal that initiates the sequence from a personal computer to which gamepad 10 is coupled.

In yet a further embodiment, which is not shown, the gamepad will include two or more motors that are configured to selectively produce a directed reactive force along different axes. The two or more motors are selectively energized to produce the reactive force along a desired axis when a mass operatively coupled to a motor is either accelerated from a stop or caused to stop moving along a specific axis.

Figure 6:
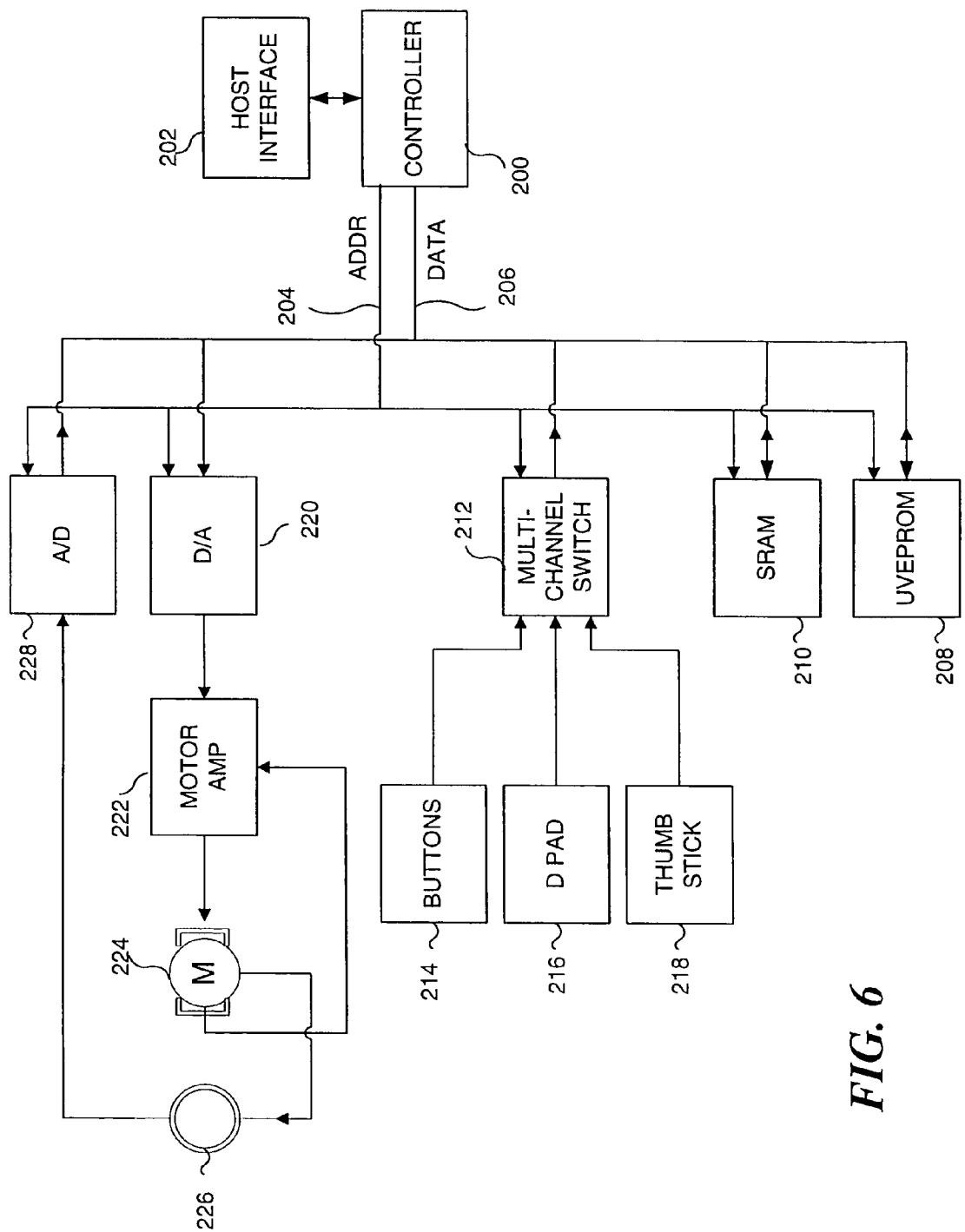
FIG. 6 is a block diagram of a system for controlling an input device that provides haptic feedback to the housing of the input device.

FIG. 6 is a block diagram of a system for controlling an input device that provides haptic feedback to the housing of the input device. The system is preferably embodied in electronic circuitry and includes a controller 200, which is a suitable processor, digital signal processor (DSP), or reduced instruction set computer (RISC) processor. Further, the system can be designed to employ an upgradable processor core, independent of input/output hardware. In addition, it is contemplated that the system can alter the executable code it implements in response to commands received from the host device. This flexibility opens up the opportunity to customize the operation of the input device for specific host applications. Controller 200 executes boot code upon start up that loads default operating firmware from onboard non-volatile memory, such as ultraviolet erasable programmable read only memory (UVEPROM) 208, and waits for a host command to begin execution, or to download operational software. The default operation code provides general force feedback, position control, and other functions not directly relevant to the present invention. Code downloaded to controller 200 from the host can be tuned for specific functions and/or characteristics. The downloaded code can either be native executable binary or pseudocode for an on-board interpreter.

Controller 200 communicates using a host interface 202 to receive control instructions or to download code from the host device. Host interface 202 also relays input signals to, and receives control signals from, the host device that initiate haptic feedback. Internally, controller 200 communicates with other components of the system by addressing each component via an address line 204. Input signals, command signals and other data signals are communicated via a data line 206. Although shown as two lines, these may be implemented in any suitable internal format, including as a bus.

Components communicating over these lines with controller 200 include UVEPROM 208, which implements non-volatile storage of code and data, and a static random access memory (SRAM) 210, which implements volatile storage of instructions and data. The system also includes a multi-channel switch 212 to route inputs from user manipulated elements, such as buttons 214, D pad 216, and thumb stick 218, to controller 200.

Controller 200 interprets haptic feedback commands from the host device and issues actuator commands to digital-to-analog (D/A) converter 220. D/A converter 220 provides force signals to motor amplifier 222, which amplifies the force signals, providing the electrical current that energizes a motor 224. Amplifier 222 may also include power management circuitry to more slowly ramp up the current supplied to energize motor 224, if a reactive momentum force is not desired when the motor is energized. The magnitude of the electrical current applied to energize motor 224 can be used to determine a torque produced by the motor. Motor 224 drives and stops the mass to impart a momentum force or impact force to the housing of the input device, and in certain embodiments noted above, the force is produced along a selected axis.

A position sensor 226, which is preferably a potentiometer, detects the position of motor 224 to indirectly determine the position of the mass. A sensor signal from the position sensor is converted to digital data by analog-to-digital (A/D) converter 228 and relayed to controller 200. The digital data enables controller 200 to indirectly determine position, velocity, and an acceleration of the mass.

Although the present invention has been described in connection with the preferred form of practicing it, those of ordinary skill in the art will understand that many modifications can be made thereto within the scope of the claims that follow. For example, an embodiment of the device could provide input to and receive force feedback control signals from a remotely controlled toy, machine, or vehicle to impart a directional force on the housing of the input device in response to physical forces detected by the remotely controlled toy, machine, or vehicle. Accordingly, it is not intended that the scope of the invention in any way be limited by the above description, but instead be determined entirely by reference to the claims that follow.

The invention claimed is:

1. A method for producing a haptic experience felt by an operator and corresponding to a condition in an electronic game environment of a host computer by developing a plurality of reactive haptic forces that are applied to the operator through a housing on an input device held by the operator, comprising the steps of:
    (a) responding to a condition in the electronic game environment of a host computer by triggering generation of a haptic sensation effect by the input device;
    (b) accessing at least one parameter for each of the plurality of reactive haptic forces that simulate the haptic sensation effect, where said at least one parameter for each of the plurality of reactive haptic forces is stored in a memory; and
    (c) generating the plurality of reactive haptic forces along a plurality of directional axes as defined by said at least one parameter for each of the plurality of reactive haptic forces by driving at least one mass disposed within the housing of the input device and operatively interconnected to a prime mover wherein the prime mover comprises a gear and an arm attached to the gear, the gear being pivotally mounted to the housing and rotating around a fixed axis, the arm extending outwardly normal to the fixed axis of rotation of the gear, wherein the movable mass is connected to the distal end of the arm such that upon the gear rotating, the movable mass moves through an arc along the plurality of directional axes such that the movement of the mass along the plurality of directional axes causes the plurality of reactive haptic forces, but the mass is not directly drivingly coupled to any other object, a change in momentum of said at least one mass along at least one directional axis producing the plurality of reactive haptic forces that are applied to the housing and are thus transmitted through the housing to create the haptic experience felt by the operator holding the housing, corresponding to a condition in the electronic game environment.

2. A method for developing a plurality of reactive haptic forces that simulate an effect in an electronic game on a host computer, wherein the plurality of reactive haptic forces are applied to an operator through a housing on an input device held by the operator, comprising the steps of:
    (a) in response to an effect in an electronic game on a host computer, detecting that a first signal has been received at the input device, said first signal causing the effect to be generated by the input device;
    (b) accessing at least one parameter for each of the plurality of reactive haptic forces that simulate the effect, where said at least one parameter for each of the plurality of reactive haptic forces is stored in a memory; and
    (c) generating the plurality of reactive haptic forces as defined by said at least one parameter for each of the plurality of reactive forces, and wherein the plurality of reactive haptic forces are generated along a plurality of directional axes by driving at least one mass disposed within the housing of the input device and operatively interconnected to a prime mover wherein the prime mover comprises a gear and an arm attached to the gear, the gear being pivotally mounted to the housing and rotating around a fixed axis, the arm extending outwardly normal to the fixed axis of rotation of the gear, wherein the movable mass is connected to the distal end of the arm such that upon the gear rotating, the movable mass moves through an arc along the plurality of directional axes such that the movement of the mass along the plurality of directional axes causes the plurality of reactive haptic forces, but the mass is not directly drivingly coupled to any other object, a change in momentum of said at least one mass along at least one directional axis producing the plurality of reactive haptic forces that are applied to the housing and are thus transmitted through the housing as haptic sensations to an operator holding the housing.

3. The method of claim 2, further comprising the step of enabling the operator to engage an operator manipulated component in the electronic game to generate the first signal.

4. The method of claim 2, wherein the electronic game generates the first signal.

5. The method of claim 2, wherein a host device generates the first signal.

6. The method of claim 2, further comprising the step of storing a plurality of parameters defining a library of effects in the memory.

7. The method of claim 6, wherein the effect that is simulated is selected from the library in response to the first signal, which indicates the effect that is selected.

8. The method of claim 6, further comprising the step of storing the plurality of parameters defining the library of effects in the memory before play of the electronic game is started.

9. The method of claim 2, wherein the effect comprises a sequence of reactive haptic forces.

10. A memory medium having machine executable instructions for carrying out the steps of claim 2.

11. An electronic gaming input device that develops a plurality of reactive haptic forces to simulate an effect in an electronic game of a host device, comprising:
    (a) a housing adapted to be held by an operator who will experience the plurality of reactive haptic forces that simulate the effect in the electronic game, a movable mass disposed within said housing and operatively connected to a driver for driving the movable mass wherein the driver comprises a gear and an arm attached to the gear, the gear being pivotally mounted to the housing and rotating around a fixed axis, the arm extending outwardly normal to the fixed axis of rotation of the gear, wherein the movable mass is connected to the distal end of the arm such that upon the gear rotating, the movable mass moves through an arc along a plurality of directional axes to move in a manner defined by a drive signal applied to the driver, the movable mass not being directly drivingly coupled to any other object;
    (b) a processor adapted to be coupled in communication with a host device; and
    (c) a memory coupled to the processor, the memory storing machine instructions causing the processor, in response to an effect in an electronic game of a host device, to:
        (i) detect that a first signal has been received at the input device, said first signal being applied to the processor to cause the effect to be generated by the input device;
        (ii) in response to the first signal being applied, access at least one parameter for each of the plurality of reactive haptic forces that simulate the effect, where said at least one parameter for each of the plurality of reactive haptic forces is stored in the memory; and
        (iii) generate the plurality of reactive haptic forces by employing the driver to drive the mass as defined by said at least one parameter for each of the plurality of reactive forces such that the movement of the mass along the plurality of directional axes causes the plurality of reactive haptic forces, a change in momentum of said mass being created along a directional x axis in a plane that is essentially parallel to a bottom of the housing, producing the plurality of reactive haptic forces that are applied to the housing and are thus transmitted through the housing as haptic sensations to an operator holding the housing.

12. The electronic gaming input device of claim 11, further comprising a user input component that is manipulated by the user to generate the first signal.

13. The electronic gaming input device of claim 11, wherein the electronic game generates the first signal.

14. The electronic gaming input device of claim 11, wherein a host device generates the first signal.

15. The electronic gaming input device of claim 11, further comprising another mass and another driver that drives the mass so that the plurality of reactive haptic forces are generated along a plurality of different directional axes.

16. The electronic gaming input device of claim 11, wherein the machine instructions further cause the processor to store a plurality of parameters defining a library of effects in the memory.

17. The electronic gaming input device of claim 11, wherein the effect that is simulated is selected from the library by the processor in response to the first signal.

18. The electronic gaming input device of claim 11, wherein the machine instructions further cause the processor to store the plurality of parameters defining the library of effects in the memory before play of the electronic game is started.

19. The electronic gaming input device of claim 11, wherein the effect comprises a sequence of reactive haptic forces.

* * * * *